United States Patent [19]
Takahashi et al.

[11] Patent Number: 5,631,992
[45] Date of Patent: May 20, 1997

[54] OPTICAL FIBER LED ASSEMBLY

[75] Inventors: Mitsuo Takahashi; Yuying Wu; Tomoyuki Mamiya, all of Matsudo, Japan

[73] Assignee: Seikoh Giken Co., Ltd., Matsudo, Japan

[21] Appl. No.: 534,587

[22] Filed: Sep. 27, 1995

[30] Foreign Application Priority Data

Mar. 27, 1995 [JP] Japan ................... 7-092972

[51] Int. Cl.$^6$ ................................ G02B 6/36
[52] U.S. Cl. ........................ 385/94; 385/93
[58] Field of Search ........................... 385/88–94

[56] References Cited

U.S. PATENT DOCUMENTS

| | | | |
|---|---|---|---|
| 4,166,668 | 9/1979 | MacLeod | 350/96.2 |
| 4,699,456 | 10/1987 | Mackenzie | 350/96.2 |
| 4,836,635 | 6/1989 | De Amorim | 350/96.2 |
| 5,353,294 | 10/1994 | Shigeno | 385/93 |
| 5,450,515 | 9/1995 | Bechtel et al. | 385/94 |

*Primary Examiner*—John Ngo
*Attorney, Agent, or Firm*—Spencer & Frank

[57] ABSTRACT

An optical fiber LED assembly for coupling light from a light source element to an optical fiber via a rod lens with distributed refractive index provides improved stability by controlling deterioration in the optical coupling efficiency of the assembly with a lapse of time. The light source element includes a light emitting element which radiates light through a transparent aperture-covering plate of a can in which it is located. The light source element is supported by a first cylindrical holder. A second cylindrical holder supports a rod lens with distributed refractive index at one end thereof and accepts and supports the distal end of an optical fiber ferrule. The second cylindrical holder is inserted and fixed in the first cylindrical holder, the rod lens with distributed refractive index being directed toward the transparent aperture-covering plate of the light source element. A seal ring is inserted in the first holder between the light emitting element and the second holder and a refractive index matching agent is hermetically charged in the space formed by the transparent aperture-covering plate and the second holder.

5 Claims, 2 Drawing Sheets

OPTICAL FIBER LED ASSEMBLY

BACKGROUND OF THE INVENTION

1. Field of the Invention

The present invention relates to an optical fiber LED assembly for coupling the light from a light emitting element such as a laser diode (LD) to an optical fiber via a rod lens with distributed refractive index.

2. Description of the Related Art

A problem with an optical fiber LED assembly having the aforesaid structure will be described with reference to FIG. 2 which is a cross-sectional view showing an optical fiber LED assembly which couples the light from a light emitting element to an optical fiber via a rod lens with distributed refractive index.

A light emitter chip 2 is supported in a hermetically sealed space formed by a base 6, a can 3, and a glass pane 5 of a light source element 1. The can 3 of the light source element 1 is inserted in a hole 8b of a first holder 8 and the base 6 is in close contact with and fixed to the hole 8b of the first holder 8.

A rod lens with distributed refractive index 9 is fixed to one end of a second holder 10 and a ferrule 11, which supports an optical fiber 13, is fixed to the other end of the second holder 10.

Both surfaces of the glass pane 5 of the light source element 1 are provided with reflectionless coating for acquiring a reflectance of about 0.2% to about 1% in general. The end surface of the rod lens with distributed refractive index 9 is also provided with similar reflectionless coating.

The light emitting point of the light emitter chip 2, which is the light emitting element, of the light source element 1 does not always coincide with the center of the can 3 surrounding the chip 2. For this reason, if the outer periphery of the can 3 is established as the reference, deviation of the optical axis would take place. To avoid such deviation of the optical axis, it is necessary to accomplish axial alignment of the order of a micron between the structure supporting the light source element 1 and the structure supporting the rod lens with distributed refractive index 9. This need makes it difficult to maintain the airtightness of the structure of the aforesaid apparatus.

Housing the above-mentioned optical fiber LED assembly itself in a vacuum vessel and exhausting air from it adds to the manufacturing cost and it also adds to the size of the entire apparatus, presenting a problem in use.

SUMMARY OF THE INVENTION

It is an object of the present invention to provide an optical fiber LED assembly wherein only a part of the aforesaid the optical fiber LED assembly is hermetically sealed and which is capable of preventing time-dependent deterioration in the optical coupling efficiency for light which is emitted from the light source device and which enters the optical fiber.

To this end, according to the present invention, there is provided an optical fiber LED assembly which is equipped with a can-shaped light emitting element for radiating light through a transparent aperture-covering plate located in the top of the can; a first cylindrical holder which supports the can-shaped light emitting element on one end thereof; a rod lens with distributed refractive index; an optical fiber ferrule; a second cylindrical holder which supports the rod lens with distributed refractive index on one end thereof, which accepts and supports the distal end of the optical fiber ferrule on the other end, and which is inserted and fixed in the first cylindrical holder, the rod lens with distributed refractive index being directed toward the transparent aperture-covering plate of the light emitting element; a seal ring which is inserted between the light emitting element and the second holder in the first holder; and a gelled refractive index matching agent which is hermetically charged in the space formed by the seal ring, the transparent aperture-covering plate, and the second holder.

In the optical fiber LED assembly, the seal member may use heat-resistant resin such as silicone rubber.

In the optical fiber LED assembly, the silicone-based refractive index matching agent, which provides a refractive index ranging from 1.4 to 1.6, may be used for the aforesaid refractive index matching agent.

DESCRIPTION OF THE PREFERRED EMBODIMENT

The present invention will be described in further detail with reference primarily to the accompanying drawings.

Figure 1:
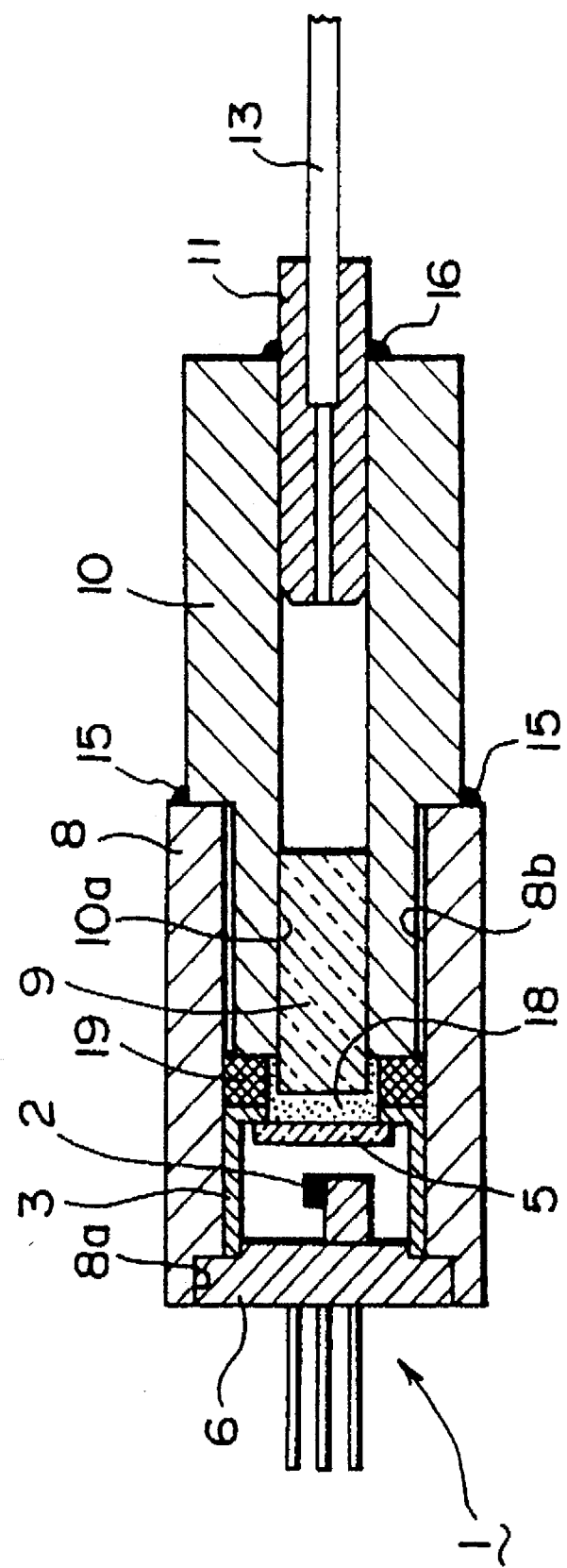
FIG. 1 is a longitudinal cross-sectional view showing an assembly illustrative of an embodiment of an optical fiber LED assembly according to the present invention.

FIG. 1 is a longitudinal cross-sectional view of the LED assembly in accordance with the present invention. The light emitter chip 2 is mounted on the projection provided on the ceramic base 6 in the airtight can 3 for protecting the light emitter, the airtight can 3 being provided integrally with the base 6 of the light source element 1. The top surface of the airtight can 3 is provided with an aperture 4 which is closed by a transparent plate such as a thin glass pane 5.

One end of a metallic first holder 8 is provided with a receiving hole 8a for receiving the base 6 of the light source element 1, the can 3 of the light source element being received in the through hole 8a of the first holder.

One end of a metallic second holder 10, i.e. a portion 10a to be inserted in the first holder 8, has an outside diameter which is 0.1 to 0.2 mm smaller than the inside diameter of the through hole 8a of the first holder so as to produce a gap. This gap is provided for coordinating the optical axis of the laser light source 1 and that of the rod lens with distributed refractive index 9.

The rod lens with distributed refractive index 9 is inserted and supported in a through hole in the portion 10a of the one end of the second holder 10. A ferrule 11, which supports the distal end of the second holder 10 of an optical fiber 13, is inserted in the other end and adjusted in axial position before it is fixed with an adhesive. The positional adjustment allows the ferrule 11 to be located and fixed so that the image of the light emitting point of the light emitter chip 2 is formed at the distal end of the optical fiber 13.

An epoxy adhesive is applied beforehand to the outer peripheral surface of the ferrule 11. The axial position of the ferrule 11 in relation to the rod lens with distributed refractive index 9 is adjusted, then the adhesive is heated at a temperature of about 100° C. to about 120° C. so as to cure it. If stainless steel is used for the second holder 10 and zirconia ceramic is used for the ferrule 11, then the ferrule 11 can be fixed in a fully hermetically sealed state because the linear expansion coefficient of the second holder 10 is larger than that of the ferrule 11, so that the ferrule 11 is press-fitted at the above-mentioned temperature.

Figure 2:
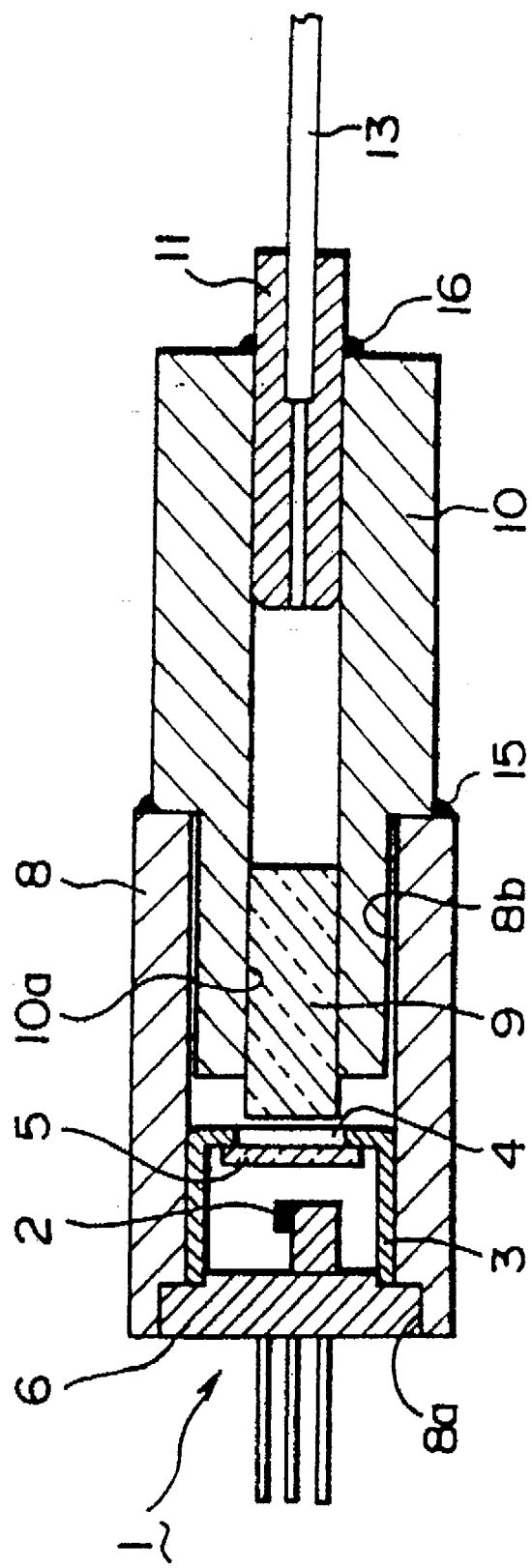
FIG. 2 is a schematic diagram showing the layout of the components of a conventional optical fiber LED assembly which couples the light from a light emitting element to an optical fiber via a rod lens with distributed refractive index.

A seal ring 19 is inserted between the light source element 1 and the second holder 10 in the first holder 8. A refractive index matching agent 18 is hermetically charged in the space formed by the seal ring 19, the aperture 4 of the light source element (see FIG. 2), and the second holder 10. The refractive index matching agent 18 is a silicone-based gelled material which preferably has a refractive index of 1.2 to 1.4. The seal ring 19 is made of a cylindrical synthetic rubber. Silicone rubber exhibits good thermal stability and it is suitably used for the seal ring 19. The seal ring 19 and the refractive index matching agent 18 are to be inserted before the second holder 10 is coupled to the first holder 8 and their optical axes are aligned. Then, the first holder 8 and the second holder 10 are spot-welded. The relative positions of the first holder 8 and the second holder 10 are adjusted, their optical axes are aligned, then a plurality of spots 15 are subjected to spot welding for fixation.

In the optical fiber LED assembly according to the present invention, the refractive index matching agent 18 is charged around the outer surface of the glass pane 5 and around the end surface of the rod lens with distributed refractive index 9 to prevent them from being exposed to air. This completely shields the glass pane and the end surface of the rod lens with distributed refractive index against open air, thus successfully solving the deterioration problem with the conventional optical system.

What is claimed is:

1. An optical fiber LED assembly comprising:

a can-shaped light source element including a can having a transparent aperture-covering plate at one end thereof and a light emitting element located within said can for radiating light through said plate;

a first cylindrical holder supporting said light source element at one end thereof;

a rod lens having a distributed refractive index;

an optical fiber ferrule;

a second cylindrical holder supporting said rod lens at one end thereof, said second cylindrical holder accepting and, supporting the distal end of said optical fiber ferrule at the other end thereof and being inserted and fixed in said first cylindrical holder, said rod lens being directed toward the plate of said light source element;

a seal member inserted within said first holder between said light source element and said second holder; and a gelled refractive index matching agent hermetically charged in the space formed by said seal member, said plate, and said second holder.

2. An optical fiber LED assembly according to claim 1, wherein said seal member is a heat-resistant resin.

3. An optical fiber LED assembly according to claim 1, wherein said refractive index matching agent is a silicone-based refractive index matching agent which provides a refractive index ranging from 1.4 to 1.6.

4. An optical fiber LED assembly according to claim 1, wherein said seal member is composed of silicone resin.

5. An optical fiber LED assembly according to claim 2, wherein said seal member is composed of a ring of silicone resin.

* * * * *